(12) United States Patent
Heinloth et al.

(10) Patent No.: US 7,841,810 B2
(45) Date of Patent: Nov. 30, 2010

(54) MILLING CUTTER HEAD

(75) Inventors: Markus Heinloth, Postbauer-Heng (DE); Ralkf Klötzer, Langewiesen (DE); Helmut Klein, Abenberg (DE)

(73) Assignee: Kennametal Widia Produktions GmbH & Co. KG, Essen (DE)

( * ) Notice: Subject to any disclaimer, the term of this patent is extended or adjusted under 35 U.S.C. 154(b) by 210 days.

(21) Appl. No.: 12/091,992

(22) PCT Filed: Nov. 21, 2006

(86) PCT No.: PCT/DE2006/002043
§ 371 (c)(1),
(2), (4) Date: Apr. 29, 2008

(87) PCT Pub. No.: WO2007/062622
PCT Pub. Date: Jun. 7, 2007

(65) Prior Publication Data
US 2008/0279643 A1    Nov. 13, 2008

(30) Foreign Application Priority Data
Dec. 2, 2005   (DE) .................. 20 2005 018 963 U

(51) Int. Cl.
*B23C 5/18* (2006.01)
(52) U.S. Cl. .................. 407/61; 407/108; 407/39
(58) Field of Classification Search ............ 407/35–39, 407/43–45, 113, 61, 101, 102, 107, 108
See application file for complete search history.

(56) References Cited

U.S. PATENT DOCUMENTS

| | | | | |
|---|---|---|---|---|
| 4,930,945 | A | 6/1990 | Arai et al. | 407/40 |
| 5,199,827 | A | 4/1993 | Pantzar | 407/42 |
| 5,971,676 | A * | 10/1999 | Kojima | 408/231 |
| 7,040,844 | B1 * | 5/2006 | Daiguji | 407/113 |
| 7,520,699 | B2 * | 4/2009 | Ballas et al. | 407/113 |
| 2002/0192041 | A1 * | 12/2002 | Wallstrom | 407/35 |
| 2004/0223816 | A1 * | 11/2004 | Sheffler et al. | 407/34 |

FOREIGN PATENT DOCUMENTS

DE   4003862 A1 *  2/1991
JP   2005111651   4/2005

* cited by examiner

*Primary Examiner*—Boyer D Ashley
*Assistant Examiner*—Sara Addisu
(74) *Attorney, Agent, or Firm*—Larry R. Meenan

(57) ABSTRACT

A milling cutter head has a base body rotatable about a longitudinal axis and formed with axially extending seats, respective blade holders axially shiftable in the seats, respective blades welded to the blade holders and each having a cutting edge, and respective wedges shiftable in the base body and engaging the blade holders, whereby the wedges can adjust axial positions of the respective blades. A clamp can fix the blade holders in the body. The cutting edge of at least one of the blades is angled and has relative to the axis a long radially outer part and a short radially inner part angled relative to the respective outer part by 3° to 7° so that the two parts form an angle of 177° to 173°.

14 Claims, 3 Drawing Sheets

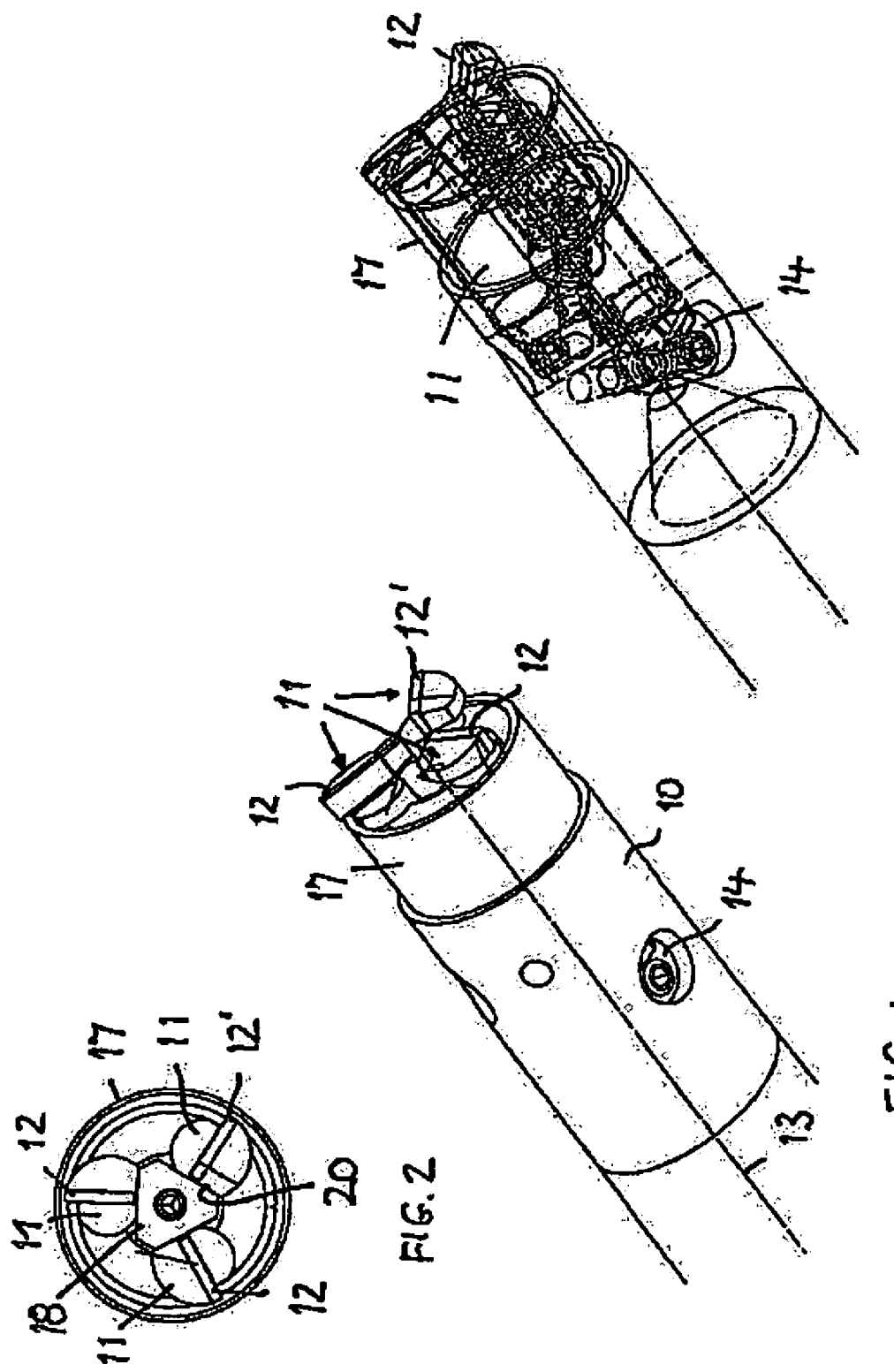

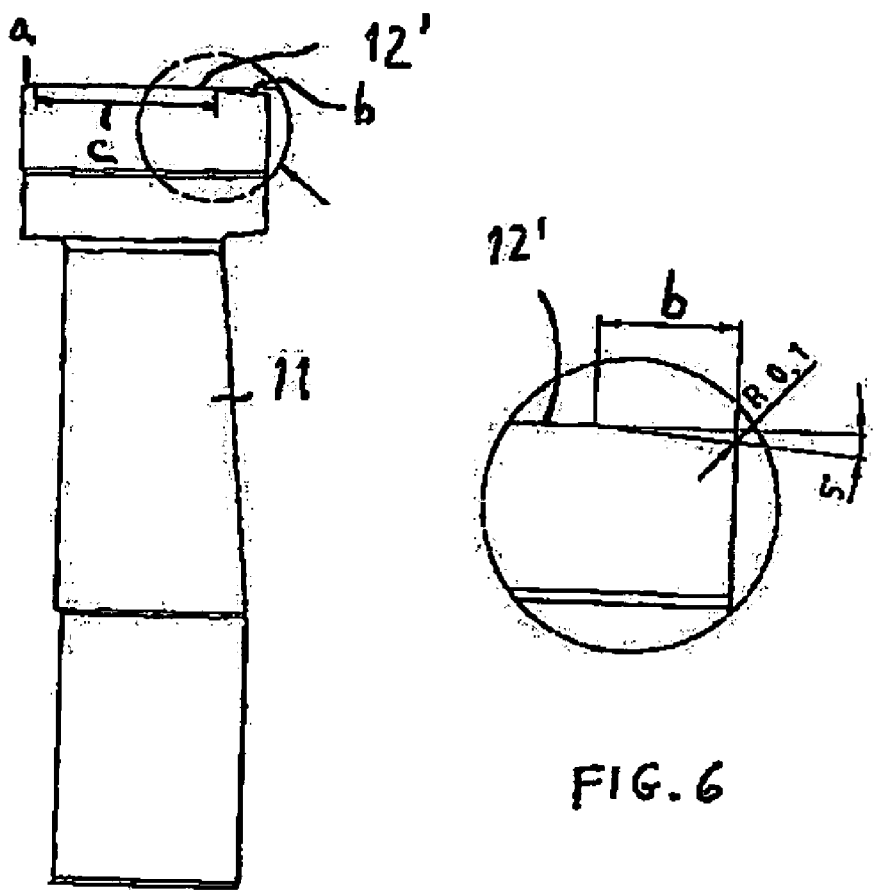
FIG.5
FIG.6
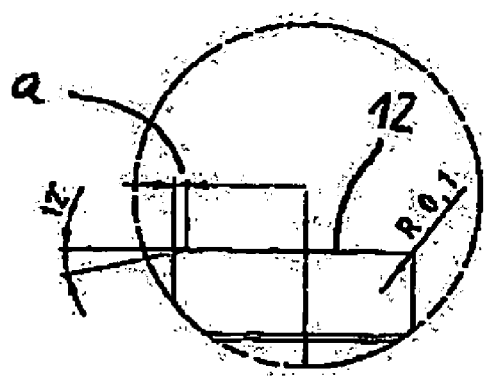
FIG.7

MILLING CUTTER HEAD

CROSS REFERENCE TO RELATED APPLICATIONS

This application is the US national phase of PCT application PCT/DE2006/002043, filed 21 Nov. 2006, published 7 Jun. 2007 as WO2007/062622, and claiming the priority of German patent application 202005018963.4 itself filed 2 Dec. 2005, whose entire disclosures are herewith incorporated by reference.

FIELD OF THE INVENTION

The invention relates to a milling cutter head with several blade holders set in seats of a base body and onto which holders blades are welded, the blade holders being axially shiftable via wedges and fixed by clamping elements in the milling cutter head.

BACKGROUND OF THE INVENTION

Such a milling cutter head is known in principle from DE 40 03 862. The seats for the blade holders extend in the cutter head described in it from the one end face of its base body parallel to its axis of rotation and offset inward from its outer edge, the cutting edges of the cutting plates in use projecting only slightly past the end face of the base body. Furthermore, the axes of the round wedges serving for retaining are skewed relative to the axes of the cutting-plate holders carrying the cutting plates. Finally, a further round wedge is provided with a differential screw for the axial adjustment of each cutting plate and is arranged in a seat extending radially inward from the circumference of the base body. Geometrically identical round wedges are used for axial adjustment and for the radially outward directed retention. It is emphasized that this cutting head has the advantage that as a result of the position of the seats receiving the cutting-plate holders, centrifugal forces without an axial component that are only radially directed parallel to the axis of the base body occur. These forces can be readily absorbed because the seats are not located directly on the outer periphery of the base body but rather radially inward at a spacing from the outer periphery. The cutter head is therefore also suitable for extremely high speeds and the centrifugal forces that then occur. Fine adjustment of the cutting elements in the axial direction without application of radial components is advantageously possible.

Such millers are used in orthogonal milling without axial advance with eccentric tool positioning, in particular in the manufacture of automobile crankshafts. To this end the workpiece is machined in one or several cycles with the initially cited multiblade millers. The workpiece rotates relative to the miller about its longitudinal axis, that extends perpendicular to the axis of rotation of the miller. Since the blades of the milling cutter head extend with their points on different radii, different cutting arcs result, which causes uneven stressing of the cutting edge along its length and consequently uneven wear.

In manufacturing technology the price of a final product produced by machining, such as, in particular, a crankshaft, is determined by several factors including even the tool cost and retooling cost.

OBJECT OF THE INVENTION

The present invention therefore has the object of improving a milling cutter head of the above-described type in such a manner that a longer blade service life can be achieved.

SUMMARY OF THE INVENTION

According to the invention at least one of the blades is angled and comprises, relative to the axis of the milling cutter head, a long, radially outer part and a short, radially inner part that is angled by 3° to 7°, preferably 5°, so that the two parts form an angle of 177° to 173°, preferably 175°. As a result of this construction the short cutting-edge parts do not participate in the cutting operation at the beginning of use of a milling cutter head provided with new blades. The long blades performs the final cut and thus wear down more rapidly than the short blades. As a result of the construction of the invention the convex surface profile is constantly adapted to the actual wear and is thus maintained for a longer blade contact time.

Thus, the length ratio of the short part to the long part of the angled blade is preferably selected to be between 4:17 and 6:17, preferably 5:17.

According to a concrete embodiment of the invention to be discussed later, the milling cutter head comprises three blade holders with blades arranged at an angle of 120° to each other. Preferably, one of three or two of three blades are angled whereas the non-angled blade is straight.

Furthermore, it has a wear-reducing effect if the ends of the blades are rounded, preferably with a radius of 0.1 mm and/or if the cutting edges themselves are rounded, preferably with a radius of 0.01 mm.

According to another embodiment of the invention the blades consist of a hard metal body, CBN body or PKD body.

BRIEF DESCRIPTION OF THE DRAWING

Other advantages and illustrated embodiments are described in the following with reference to the drawings. Therein:

FIG. 1 is a perspective view of a milling cutter head with three blade holders,

FIG. 2 is an end view of the milling cutter head according to FIG. 1,

FIG. 3 is a wire-model view of the milling cutter head according to FIG. 1,

FIG. 5 is a side view of a blade holder with an angled blade, FIG. 6 is a detail view showing the blade angle, and FIG. 7 a view of a detail of the blade of a blade holder according to FIG. 4.

SPECIFIC DESCRIPTION

Figure 4:
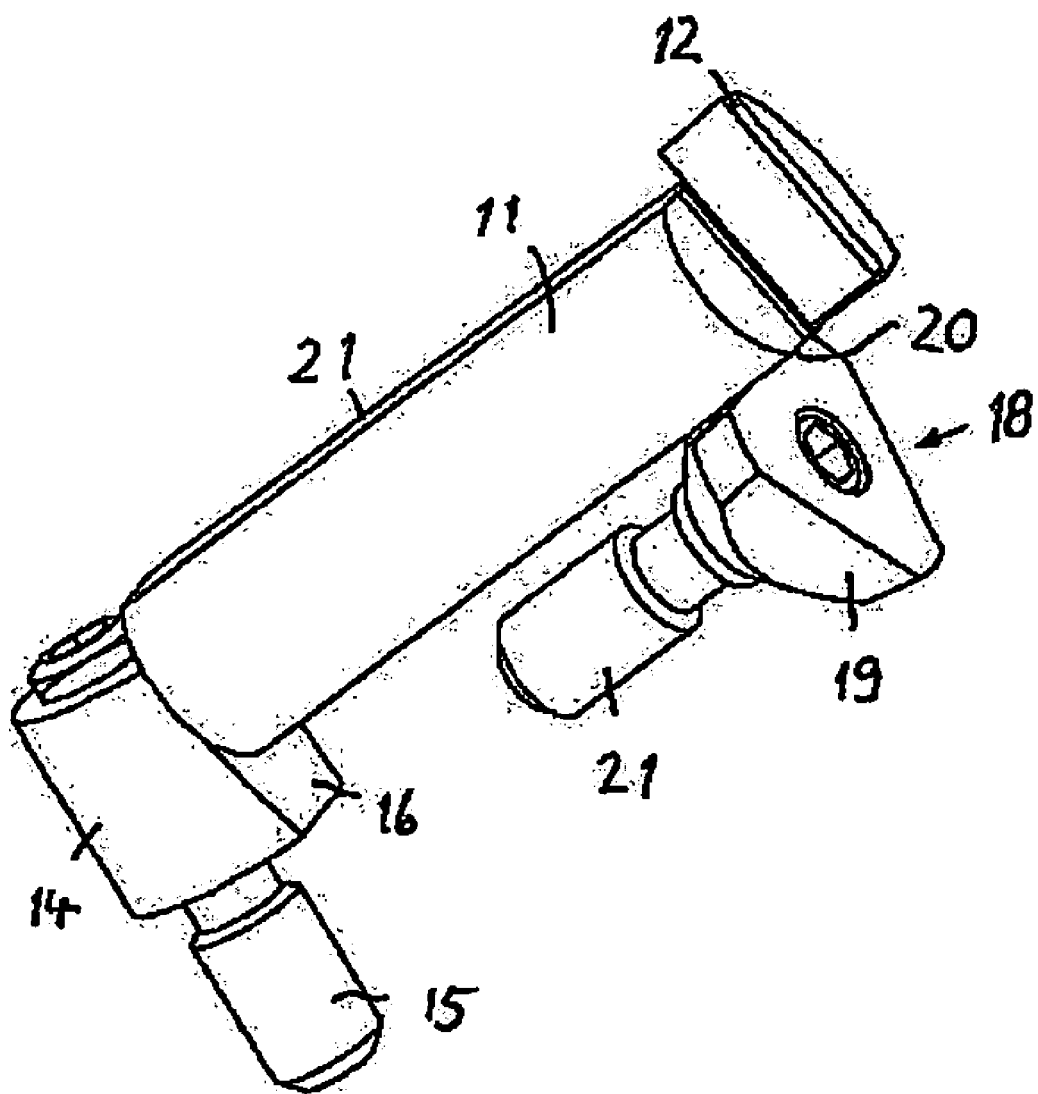
FIG. 4 is a diagrammatic view of the relative positions of a blade holder, a clamping block, and a wedge for axial adjustment.

The milling cutter head 10 consists substantially of a base body 10 in which three blade holders 11 with welded-on blades 12 are mounted. The blade holders 11 are inserted in bores extending parallel to a longitudinal axis 13. Other bores provided in the base body 10 extend substantially radially or at a slight angle thereto and accommodate respective bore wedges 14 that can each be moved in radially by a respective adjusting screw 15, preferably a double-threaded screw. As is apparent from FIG. 4, these wedges 14 have wedge faces 16 that run obliquely to a radial plane of the base body 10 so that, on radial movement of the wedges 14, the respective blade holders 11 move along their longitudinal axes. In order to clamp the blade holders 11 a clamping ring 17 (see FIGS. 1 and 2) and a clamping block 18 are used, which clamping block 18 is centrally positioned and has three clamping faces 19 bearing on corresponding clamping faces 20 of the blade holders 11. The clamping block 18 can be fixed by a screw 21 preferably designed as a double-threaded screw. The clamping block 18 serves in the illustrated embodiment to fix three blade holders 11 each with a respective one of the clamping faces 20. The design of the clamping block 18 and the arrangement of clamping surfaces 19 in a triangle ensures exact alignment of the blades 12 with the blade holders 11 spaced at angles of 120° to each other. Each blade holder 11 can be axially adjusted via the respective round wedge 14 and the associated screw 15. The clamping ring 17, which is tubular, serves to align the blades 12 and the respective cutting insert holders 11 on planes including the axis 13. The base body 10 and clamping ring 17 have contacting cylindrical surfaces in the tensioned state. As FIG. 4 shows, each blade holder 11 has a narrow, radially outwardly directed machined face 21 that extends in a longitudinal axial plane. This surface 21 ensures a double-line contact between the clamping ring 17 and the holder 11 of the respective blade 12.

The difference between the blades 12 running at least substantially in a straight line and angled blades 12' becomes clear in particular from FIGS. 6 and 7. Whereas cutting edges of the blades 12 extend in a straight line along almost their entire lengths and have beveled edges inclined by 12° over a minimal, outer part a of, e.g. 0.5 mm for a total blade length of 8.5 mm with a corner rounding at a radius R of 0.1 mm on the other end, it can be seen from FIGS. 5 and 6 that a cutting-edge portion with a length b that extends over 2.5 mm at an edge length 8.5 mm long is angled by 5° on the radially inner part. In addition, the corner is also rounded with a radius R of 0.1 mm.

In the illustrated embodiment shown only one blade 12' is angled back over the length b, whereas on the other hand the two other blades 12 (except for the short angling b and the edge rounding) run in a straight line.

However, according to an alternative those milling cutter heads are also covered in which two or three blades are angled according to the views in FIGS. 5 and 6. If the milling cutter head is used in orthogonal rotary milling or axial advance and eccentric tool positioning, in particular crankshaft outer surfaces can be produced with a distinctly smaller rotary-milled outer-surface diameters.

The illustrated miller is especially suitable for orthogonal rotary milling work but also for the fine milling of aluminum workpieces. A particular application possibility for the miller according to the invention is the finish machining of crankshafts (instead of grinding), in particular to replace wet grinding that has the disadvantage that contaminated cooling lubricants must be disposed of in an expensive and labor-intensive manner. The milling cutter head according to the invention meets high requirements of rotation, surface quality, convexity of the bearing seat and permits an economical manufacture of its parts.

The invention claimed is:

1. A milling cutter head comprising:
   a base body rotatable about a longitudinal axis and formed with axially extending seats;
   respective blade holders axially shiftable in the seats;
   respective blades welded to the blade holders and each having a cutting edge;
   respective wedges shiftable in the base body and engaging the blade holders, whereby the wedges can adjust axial positions of the respective blades; and
   clamping means for fixing the blade holders in the body, the cutting edge of at least one of the blades being angled and having relative to the axis a long radially outer part and a short radially inner part angled relative to the respective outer part by 3° to 7° so that the two parts form an angle of 177° to 173°.

2. The milling cutter head according to claim 1 wherein a length ratio of the short part to the long part of the angled blade is between 4:17 and 6:17.

3. The milling cutter head according to claim 2 wherein the ratio if 5:17.

4. The milling cutter head according to claim 1 wherein there are three such blade holders with blades arranged at an angle of 120° to each other.

5. The milling cutter head according to claim 4 wherein only one or two of the three blades is/are angled.

6. The milling cutter head according to claims 1 wherein ends of the blades are rounded.

7. The milling cutter head according to claim 6 wherein the blades have ends that are rounded to a radius of 0.1 mm.

8. The milling cutter head according to claim 1 wherein the cutting edges are rounded.

9. The milling cutter head according to claim 8 wherein the cutting edges are rounded to a radius of 0.01 mm.

10. The milling cutter head according to claim 1 wherein a radially outer edge region of the cutting edge is inclined over a stretch of maximally 1 mm at an angle of 12°.

11. The milling cutter head according to claim 1 wherein the blades consist of a hard metal body, a cubic-boron-nitride body or a polycrystalline diamond body.

12. The milling cutter head according to claim 1 wherein the angle between the outer part and the inner part is 5°.

13. The milling cutter head according to claim 1 wherein the radially outer edge region of the cutting edge is inclined over 0.5 mm.

14. The milling cutter head defined in claim 1 wherein the cutting edge of at least one of the blades is straight.

* * * * *